(12) United States Patent
Sie (10) Patent No.: US 12,093,120 B2
(45) Date of Patent: Sep. 17, 2024

(54) LIGHTING METHOD AND APPARATUS BASED ON AMD PLATFORM, DEVICE AND READABLE MEDIUM

(71) Applicant: SHANDONG YINGXIN COMPUTER TECHNOLOGIES CO., LTD., Shandong (CN)

(72) Inventor: Wu Jhih Sie, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/270,171

(22) PCT Filed: Apr. 24, 2022

(86) PCT No.: PCT/CN2022/088711
§ 371 (c)(1),
(2) Date: Jun. 28, 2023

(87) PCT Pub. No.: WO2022/228333
PCT Pub. Date: Nov. 3, 2022

(65) Prior Publication Data
US 2024/0045751 A1    Feb. 8, 2024

(30) Foreign Application Priority Data
Apr. 25, 2021    (CN) .......................... 202110450144.7

(51) Int. Cl.
*G06F 11/00*    (2006.01)
*G06F 11/07*    (2006.01)

(52) U.S. Cl.
CPC ........ *G06F 11/0772* (2013.01); *G06F 11/073* (2013.01)

(58) Field of Classification Search
None
See application file for complete search history.

(56) References Cited

U.S. PATENT DOCUMENTS 8,830,611 B1 *    9/2014    Chen ..................... G06F 11/325
                                                                    360/31
11,392,440 B2 *    7/2022    Hao ..................... G06F 11/0706
(Continued)

FOREIGN PATENT DOCUMENTS

CN    107145430 A    9/2017
CN    107766213 A    3/2018
(Continued)

OTHER PUBLICATIONS

Google Scholar/Patents search—text refined (Year: 2023).*
(Continued)

*Primary Examiner* — Christopher S McCarthy
(74) *Attorney, Agent, or Firm* — Merchant & Gould P.C.

(57) ABSTRACT

The disclosure discloses a lighting method based on an Advanced Micro Device (AMD) platform, including the following steps: transmitting, by a Central Processing Unit (CPU), packets in groups to a Non-Volatile Memory Express (NVME) hard disk management system to acquire status information of an NVME hard disk; transmitting, by the CPU, the acquired status information to a Complex Programmable Logic Device (CPLD) backplane through a Baseboard Management Controller (BMC); and in response to receiving the status information, lighting, by the CPLD backplane, a lamp corresponding to an error lamp number based on the status information. The disclosure further discloses a lighting apparatus based on an AMD platform, a computer device, and a readable storage medium.

20 Claims, 5 Drawing Sheets

(56) References Cited

U.S. PATENT DOCUMENTS

| | | | | |
|---|---|---|---|---|
| 11,438,987 B2* | 9/2022 | Ning | ................... | H05B 47/175 |
| 2017/0161137 A1* | 6/2017 | Wang | ................... | G06F 11/326 |
| 2020/0117568 A1* | 4/2020 | Cheng | ................ | G06F 11/3037 |
| 2020/0341926 A1* | 10/2020 | Tu | ........................ | G06F 3/0632 |

FOREIGN PATENT DOCUMENTS

| | | |
|---|---|---|
| CN | 108829567 A | 11/2018 |
| CN | 109240894 A | 1/2019 |
| CN | 109240896 A | 1/2019 |
| CN | 110806964 A | 2/2020 |
| CN | 111090568 A | 5/2020 |
| CN | 112069040 A | 12/2020 |
| CN | 113204474 A | 8/2021 |
| JP | H11203210 A | 7/1997 |

OTHER PUBLICATIONS

Google Scholar/Patents search—text refined (Year: 2024).*
International Search Report for PCT/CN2022/088711 mailed on Jul. 18, 2022 (6 pages including English Translation).
Written Opinion for PCT/CN2022/088711 mailed on Jul. 18, 2022 (9 pages including English Translation).
Chinese Search Report for Application No. 2021104501447 dated Jun. 14, 2022 (2 pages).
Chinese Search Report for Application No. 2021104501447 dated Jan. 17, 2023 (2 pages).

* cited by examiner

LIGHTING METHOD AND APPARATUS BASED ON AMD PLATFORM, DEVICE AND READABLE MEDIUM

CROSS-REFERENCE TO RELATED APPLICATION

This application is a National Stage Application of International Application No. PCT/CN2022/088711, filed 24 Apr. 2022, which claims benefit of Serial No. 202110450144.7, filed 25 Apr. 2021 in China, and which applications are incorporated herein by reference. To the extent appropriate, a claim of priority is made to each of the above disclosed applications.

TECHNICAL FIELD

The disclosure relates to the technical field of servers, and in particular, to a lighting method and apparatus based on an Advanced Micro Device (AMD) platform, a device and a readable medium.

BACKGROUND

In a server in an Intel® platform, a lighting control manner for a Non-Volatile Memory Express (NVME) hard disk is mainly that a Central Processing Unit (CPU) transmits information in a Virtual Pin Port (VPP) format to a Complex Programmable Logic Device (CPLD) backplane through an Inter-Integrated Circuit (I2C), and the CPLD acquires Light-Emitting Diode (LED) information that needs to be lit from the information in the VPP format. Bit information in the VPP format includes: a Bit7 output representing Electro-Mechanical Interlock Control (EMIL) information; a Bit6 input representing manual fixed latch sensing present information; a Bit5 input representing Power Fault (PWRFLT) information; a Bit4 input representing Drive Present Status (PRSNT, PCIE card present status) information, 0 representing present, and 1 representing not present; a Bit3 input representing Button information, 0 representing pressed, and 1 representing not pressed; a Bit2 output representing Power Enable (PWREN) information, 0 representing power enabled, and 1 representing power not enabled; a Bit1 output representing Power LED (PWRLED) information, which is equivalent to a present lamp number under an SFF8485 specification; and a Bit0 output represents Attention LED (ATNLED) information, which is equivalent to an error lamp number under the SFF8485 specification.

However, in an Enterprise mode in an AMD® platform, the error lamp number is not defined. In this mode, the AMD® platform does not have Bit 0 similar to that in VPP of the Intel® for displaying the error lamp number. The information in the VPP format of the AMD® platform includes: a Bit3 input representing reserved information; a Bit2 output representing Dual Port Enable (DUALPORTEN) information; a Bit1 output representing Interface Detection Signal (IFDET) information; and the Bit0 representing Present Signal (PRSNT) information.

Figure 1:
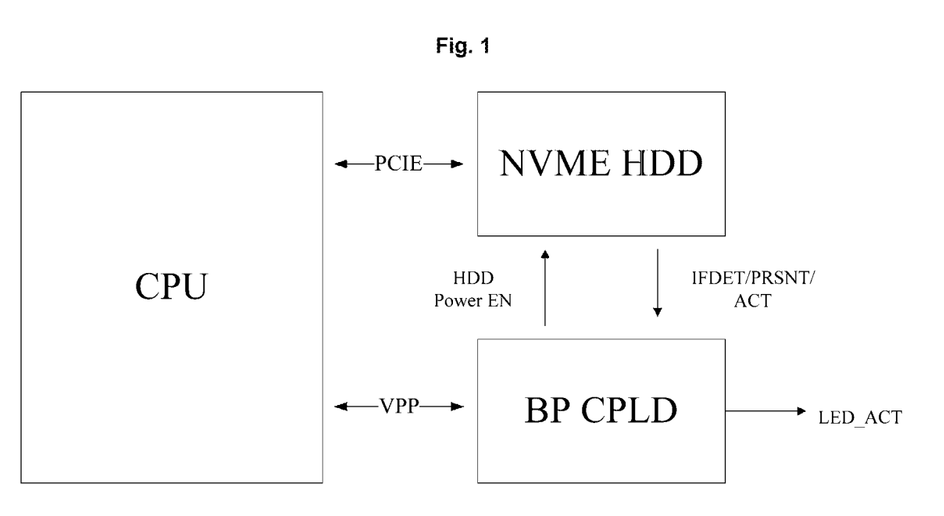
FIG. 1 is a schematic diagram of AMD platform lighting control in the conventional art.
Figure 2:
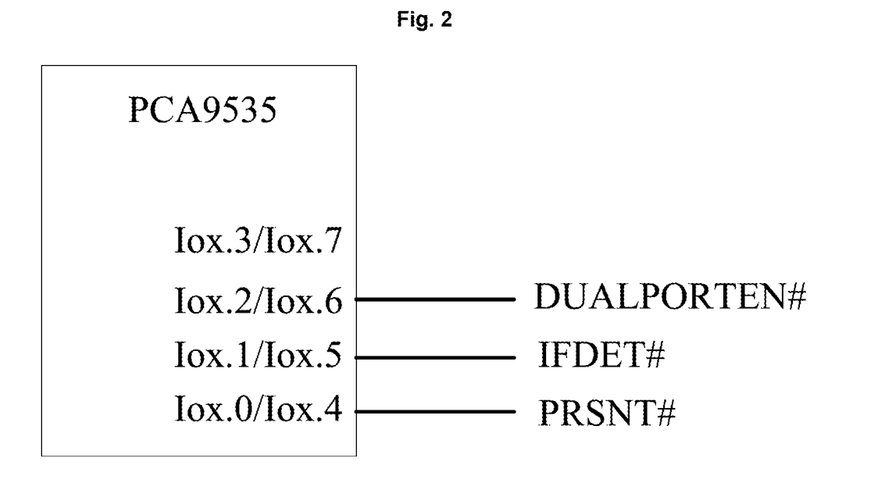
FIG. 2 is a schematic structural diagram of information corresponding to a VPP of an AMD platform in the conventional art.

FIG. 1 is a schematic diagram of AMD® platform lighting control in the conventional art. The CPU is connected to the CPLD backplane through the VPP, and is connected to the NVME hard disk through the CPLD. The NVME hard disk transmits IFDET information, PRSNT information, and ACTLED information to the CPLD backplane, and the CPLD backplane transmits hard disk power enable information to the NVME hard disk. FIG. 2 shows information corresponding to the VPP of the AMD® platform in the conventional art. As shown in FIG. 2, the VPP in the Enterprise mode of the AMD® platform only defines the IFDET information, the PRSNT information, and the DUALPORTEN, does not contain the error lamp number, and meanwhile, an LED ACT lamp is controlled through ACTLED information transmitted by the CPLD backplane through a hard disk.

SUMMARY

At least some of the embodiments of the disclosure provides a lighting method based on an AMD platform, which includes following steps: transmitting, by a CPU packets in groups to an NVME hard disk management system to acquire status information of an NVME hard disk; transmitting by the CPU, the acquired status information to a CPLD backplane through a Baseboard Management Controller (BMC); in response to receiving the status information, lighting, by the CPLD backplane, a lamp corresponding to an error lamp number based on the status information.

In some implementations, transmitting, by a CPU packets in groups to an NVME hard disk management system to acquire status information of an NVME hard disk includes: transmitting, by the CPU, a first group of commands to the NVME hard disk management system, and judging whether status information returning an NVME error is received within preset period: in response to receiving the status information returning the NVME error within the preset period, transmitting a next group of commands to the NVME hard disk management system; in response to not receiving the status information returning the NVME error within the preset period, transmitting a next group of commands to the NVME hard disk management system after the preset period.

In some implementations, the method further includes: in response to receiving the status information of returning the NVME error within the preset period, transmitting, by the CPU, the status information to the CPLD backplane through the BMC.

In some implementations, transmitting, by the CPU packets in groups to the NVME hard disk management system to acquire status information of the NVME hard disk includes: transmitting, by the CPU, management component transport protocol packets in groups to the NVME hard disk management system to acquire the status information of the NVME hard disk.

In some implementations, transmitting, by the CPU packets in groups to the NVME hard disk management system to acquire status information of the NVME hard disk includes: transmitting, by the CPU, the management component transport protocol packets in groups to the NVME hard disk management system through a Peripheral Component Interconnect Express (PCIE) interface to acquire the status information of the NVME hard disk.

In some implementations, transmitting, by the CPU, the acquired status information to the CPLD backplane through the BMC includes: transmitting, by the CPU, the acquired status information to the BMC through a system management bus; and receiving, by the BMC, the status information transmitted by the CPU, and transmitting the status information to the CPLD backplane through the system management bus.

In some implementations, in response to receiving the status information, lighting, by the CPLD backplane, the lamp corresponding to the error lamp number based on the status information includes: in response to receiving the status information, finding, by the CPLD backplane, the error lamp number corresponding to an error hard disk based on the status information; lighting, by the CPLD backplane, the lamp corresponding to the error lamp number.

An embodiment of the present disclosure provides a lighting apparatus based on an AMD platform, which includes: a first module, configured to transmit, by a CPU, packets in groups to a NVME hard disk management system to acquire status information of the NVME hard disk; a second module, configured to transmit, by the CPU, the acquired status information to a CPLD backplane through a BMC; and a third module, configured to light, by the CPLD backplane, a lamp corresponding to an error lamp number based on the status information in response to receiving the status information.

An embodiment of the present disclosure provides a computer device, including at least one processor, and a memory. The memory is configured to store a computer-readable instruction capable of running on the processor. When the computer-readable instruction is executed by the at least one processor, the at least one processor implements steps of the lighting method based on the AMD platform in any one of the above embodiments.

An embodiment of the present disclosure provides a computer-readable storage medium. The computer-readable storage medium is configured to store a computer-readable instruction capable of running on the processor. When the computer-readable instruction is executed by the at least one processor, the at least one processor implements steps of the lighting method based on the AMD platform in any one of the above embodiments.

BRIEF DESCRIPTION OF THE DRAWINGS

In order to describe the embodiments of the disclosure or related methods more clearly, the drawings that may be involved in the embodiments or the related description will be briefly described below. It is apparent that the drawings in the following description are only some embodiments of the disclosure, and other drawings can also be obtained by those of ordinary skill in the art according to these drawings without any creative work.

DETAILED DESCRIPTION OF THE EMBODIMENTS

In order to make the technical solutions and advantages of the disclosure clearer, the embodiments of the disclosure will be further described in detail below with reference to embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present application, which are not described one by one thereto in the subsequent embodiments.

Figure 3:
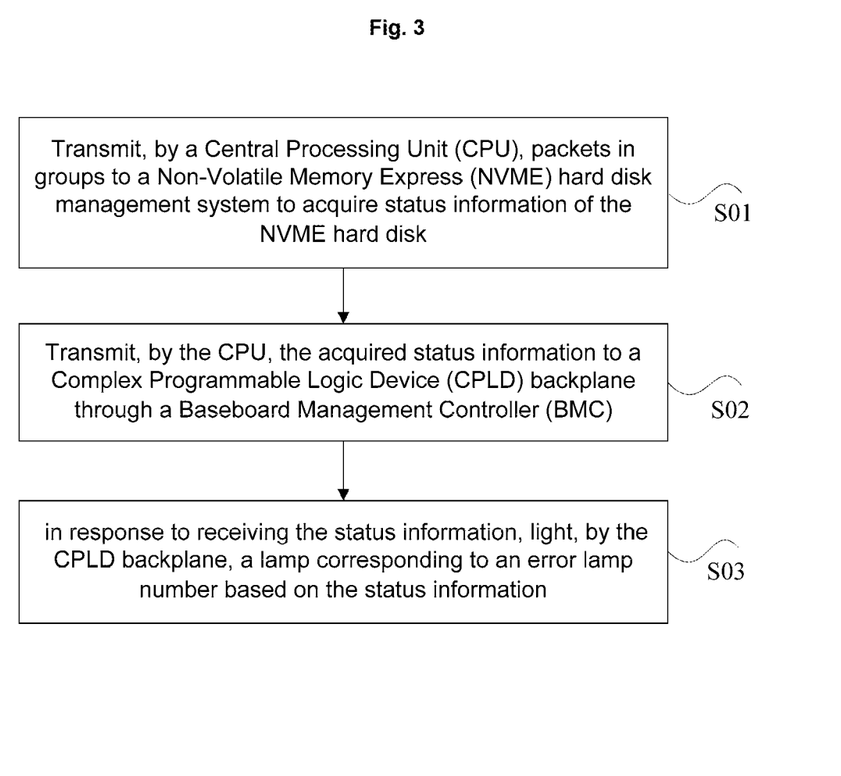
FIG. 3 is a schematic diagram of an embodiment of a lighting method based on an AMD platform according to an embodiment.

In an embodiment, the embodiment of the disclosure provides a lighting method based on an AMD platform. FIG. 3 is a schematic diagram of a lighting method based on an AMD platform provided by the embodiment of the disclosure. As shown in FIG. 3, the embodiment of the disclosure includes the following steps.

At step S01, transmitting, by a CPU, packets in groups to an NVME hard disk management system to acquire the status information of the NVME hard disk.

At step S02, transmitting, by the CPU, the acquired status information to a CPLD backplane through a BMC.

At step S03, in response to receiving the status information, lighting, by the CPLD backplane, a lamp corresponding to an error lamp number based on the status information.

In this embodiment, the CPU communicates with an NVME Hard-Disk Drive (HDD) management interface through a PCIE interface; the CPU transmits MCTP packets, and whether there is an error of the internal status of the NVME HDD; after obtaining the internal status of the NVME HDD, the CPU transmits the internal status of the NVME HDD to the BMC through an System Management Bus (SMBUS); and the BMC transmits the internal status of the NVME HDD to the CPLD through the SMBUS; and the CPLD lights a lamp signal LED_ERROR according to the acquired internal status of the NVME HDD.

Figure 4:
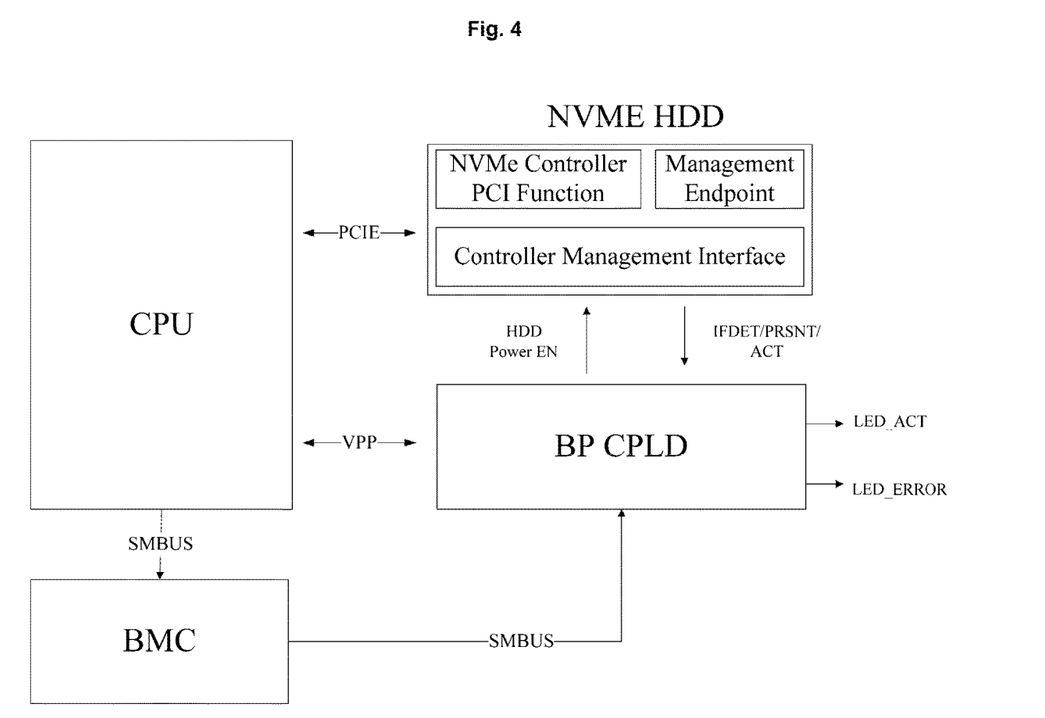
FIG. 4 is a schematic structural diagram of an embodiment of a lighting method based on an AMD platform according to an embodiment.

FIG. 4 is a schematic structural diagram of a lighting method based on the AMD platform provided by the embodiments of the disclosure. As shown in FIG. 4, the full name of the CPU is a Central Processing Unit, which is one of main devices of an electronic computer and is a core accessory in a computer. The function of the CPU is mainly to interpret a computer-readable instruction and process data in computer software. The full name of the PCIE is Peripheral Component Interconnect Express, which belongs to high speed serial peer-to-peer dual channel high bandwidth transmission; and a connected device allocates an exclusive channel bandwidth, and does not share a bus bandwidth. The full name of the NVME is Non-Volatile Memory Express; and the NVME hard disk management system includes an NVME Programmable Interrupt Controller (PIC) functional controller, a management endpoint, and a management interface controller. The full name of the BMC is a Board Management Controller, and a system is ensured to be in a normal running status through monitoring the power supply, the temperature, and the like of the system. The full name of the CPLD is a Complex Programmable Logic Device, which forms a high-density, high-speed, and low-power consumption programmable logic device by using programming technologies such as a Complementary Metal Oxide Semiconductor (CMOS) Erasable Programmable Read-Only Memory (EPROM), an Electrically Erasable Programmable Read-Only Memory (EEPROM), a flash memory, and a Static Random Access Memory (SRAM). The full name of the VPP is a Virtual Pin Port.

In this embodiment, the CPU interacts with the NVME through the PCIE, and transmits information to the BMC through the SMBUS. The BMC transmits information to the CPLD through the SMBUS. The CPLD displays the error lamp number of LED_ERROR. The NVME hard disk management system includes an NVME PIC functional controller, a management endpoint, and a management interface controller. The NVME hard disk management system transmits the interface detection signal information IFDET, the present signal PRSNT, and activity signal information ACT to a CPLD backplane. The CPLD backplane transmits HDD Power EN to the NVME hard disk management system. Meanwhile, the CPU transmits the information in the VPP format to the CPLD backplane through the VPP. The CPLD backplane displays an active lamp number of LED ACT.

In this embodiment, the Enterprise mode in the AMD platform does not define the error lamp number. In this mode, the AMD platform does not have Bit 0 similar to that in Intel VPP for displaying the error lamp number. The information in the VPP format of the AMD platform includes: a Bit3 input representing reserved information; a Bit2 output representing Dual Port Enable (DUAL-PORTEN) information; a Bit1 output representing Interface Detection Signal (IFDET) information; and Bit0 representing Present Signal (PRSNT) information. The CPU is connected to the CPLD backplane through the VPP, and is connected to an NVME hard disk through the PCIE. The NVME hard disk transmits IFDET information, PRSNT information, ACTLED information to the CPLD backplane, and the CPLD backplane transmits hard disk power enable information to the NVME hard disk.

In this embodiment, the problem that the error lamp number information cannot be transmitted in the enterprise mode of the AMD platform, resulting in that the error lamp number cannot be lighted is solved. The CPU acquires the internal status of the hard disk, so that the CPLD backplane is controlled to light the error lamp number through the BMC, thereby realizing supporting the control of the error lamp number in the enterprise mode of the AMD platform.

In some embodiments of the disclosure, the CPU transmits packets in groups to the NVME hard disk management system to acquire status information of the NVME hard disk includes: the CPU transmits a first group of commands to the NVME hard disk management system, and judges whether status information of returning an NVME error is received within preset period. In response to receiving the status information of returning the NVME error within the preset period, a next group of commands is transmitted to the NVME hard disk management system. In response to not receiving the status information returning the NVME error within the preset period, a next group of commands is transmitted to the NVME hard disk management system after the preset period.

In the present embodiment, the CPU transmits a command byte 0 to a command byte 9 to the NVME hard disk management system, judges whether status information of returning an NVME error is received within preset period, and in response to receiving the status information returning the NVME error or not receiving the status information returning the NVME error within the preset period, continues to transmit a command byte 10 to a command byte 15 to the NVME hard disk management system until confirming whether all internal information of the NVME hard disk has an error.

In some embodiments of the disclosure, the lighting method based on an AMD platform further includes: in response to receiving the status information of returning the NVME error within the preset period, the CPU transmits the status information to the CPLD backplane through the BMC.

In some embodiments of the disclosure, the CPU transmits packets in groups to the NVME hard disk management system to acquire status information of the NVME hard disk includes: the CPU transmits MCTP packets in groups to the NVME hard disk management system to acquire the status information of the NVME hard disk.

In this embodiments, the packets refers to that data can only be transmitted in a network after being subjected to certain processing in a communication system. For example, the data can only be transmitted on the network according to a certain communication protocol after being partitioned into multiple blocks. This process likes packaging a package, and is referred to as packaging.

In some embodiments of the disclosure, the CPU transmits packets in groups to the NVME hard disk management system to acquire status information of the NVME hard disk includes: the CPU transmits transport protocol packets in groups to the NVME hard disk management system through a PCIE interface to acquire the status information of the NVME hard disk.

In some embodiments of the disclosure, the CPU transmits the acquired status information to the CPLD backplane through the BMC includes: the CPU transmits the acquired status information to the BMC through a system management bus; and the BMC receives the status information transmitted by the CPU, and transmits the status information to the CPLD backplane through the system management bus.

In some embodiments of the disclosure, lighting, by the CPLD backplane, the lamp corresponding to the error lamp number based on the status information: in response to receiving the status information, the CPLD backplane finds the error lamp number corresponding to the error hard disk based on the status information; and the CPLD backplane lights the lamp corresponding to the error lamp number.

It is to be particularly noted that multiple steps in multiple embodiments of the above lighting method based on the AMD platform may be crossed with, replaced with, added to, or deleted from each other, so that these rational permutation and combination transformations for the lighting method based on an AMD platform should also belong to the scope of protection of the disclosure, and the scope of protection of the disclosure are not to be limited to the embodiments.

In the disclosure, the problem that the error lamp number information cannot be transmitted in the enterprise mode of the AMD platform, and the error lamp number cannot be lighted is solved. The CPU acquires the internal status of the hard disk, and the CPLD is controlled to light the error lamp number through the BMC, thereby realizing supporting the control of the error lamp number in the enterprise mode of the AMD platform.

Figure 5:
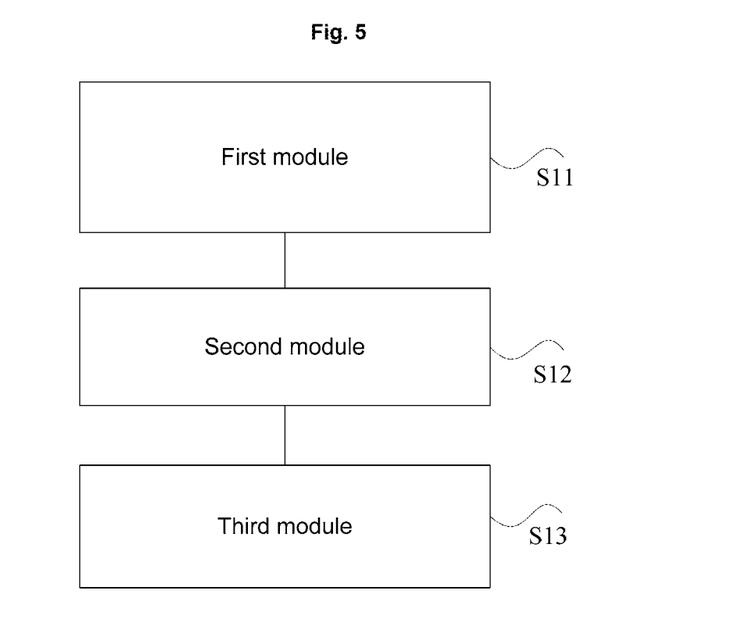
FIG. 5 is a schematic diagram of an embodiment of a lighting apparatus based on an AMD platform according to an embodiment.

In an embodiment of the present disclosure provide a lighting apparatus based on the AMD platform. FIG. 5 is a schematic diagram of a lighting apparatus based on the AMD platform provided by the embodiment of the disclosure. As shown in FIG. 5, the embodiment of this application includes the following modules: a first module S11, configured to transmit, by a CPU, packets in groups to a NVME hard disk management system to acquire status information of the NVME hard disk; a second module S12, configured to transmit, by the CPU, the acquired status information to a CPLD backplane; and a third module S13, configured to: light, by the CPLD backplane, a lamp corresponding to an error lamp number based on the status information in response to receiving the status information.

In some embodiments of the disclosure, the first module S11 is further configured to: transmit, by the CPU, a first group of commands to the NVME hard disk management system, and judge whether status information returning an NVME error is received within preset period; in response to receiving the status information of returning the NVME error within the preset period, transmit a next group of commands to the NVME hard disk management system; and in response to not receiving the status information returning the NVME error within the preset period, transmit a next group of commands to the NVME hard disk management system after the preset period.

In some embodiments of the disclosure, the first module S11 is further configured to: in response to receiving the status information of returning the NVME error within the preset period, the CPU transmits the status information to the CPLD backplane through the BMC.

In some embodiments of the disclosure, the first module S11 is further configured to: transmit, by the CPU, MCTP packets in groups to the NVME hard disk management system to acquire the status information of the NVME hard disk.

In some embodiments of the disclosure, the first module S11 is further configured to: transmit, by the CPU, transport protocol packets in groups to the NVME hard disk management system through a PCIE interface to acquire the status information of the NVME hard disk.

In some embodiments of the disclosure, the second module S12 is further configured to: transmit, by the CPU, the acquired status information to the BMC through an SMBUS, receive, by the BMC, the status information transmitted by the CPU, and transmits the status information to the CPLD backplane through the SMBUS.

In some embodiments of the disclosure, the third module S13 is further configured to: in response to receiving the status information, find, by the CPLD backplane, the error lamp number corresponding to an error hard disk based on the status information, and light, by the CPLD backplane, a lamp corresponding to an error lamp number based on the status information.

Figure 6:
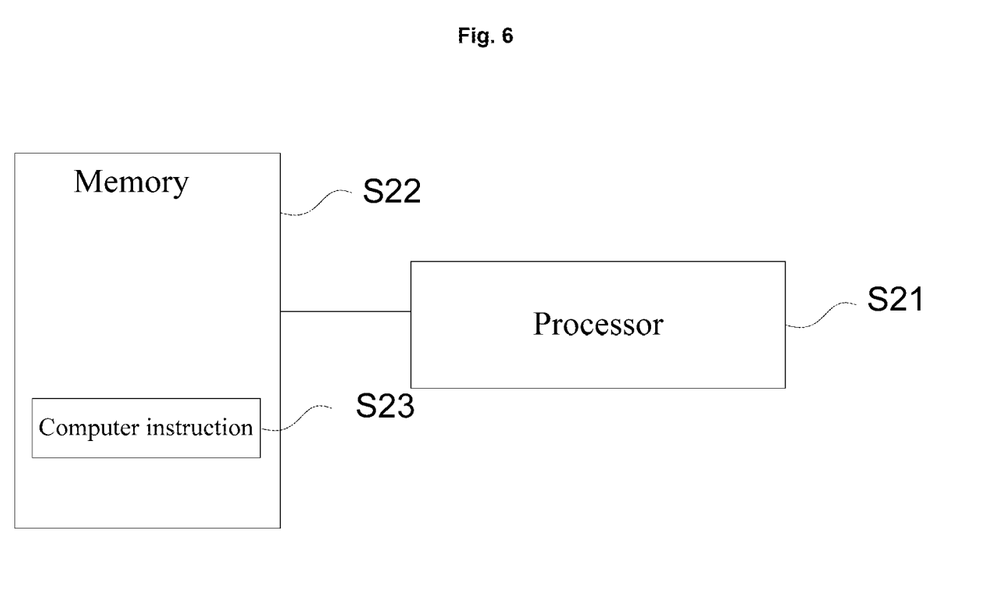
FIG. 6 is a schematic diagram of an embodiment of a computer device according to an embodiment.

In an embodiment of the present disclosure further provide a computer device. FIG. 6 is a schematic diagram of a computer device provided by the embodiment of the disclosure. As shown in FIG. 6, the embodiment of the disclosure includes the following apparatuses: at least one processor S21, and a memory S22. The memory S22 is configured to store a computer-readable instruction S23 capable of running on the process. When the computer-readable instruction S23 is executed by the at least one processor S21, the at least one processor S23 implements steps of the lighting method based on an AMD platform in any one of the above embodiments: the CPU transmits packets in groups to an NVME hard disk management system to acquire status information of an NVME hard disk; the CPU transmits the acquired status information to a CPLD backplane through a BMC; and in response to receiving the status information, the CPLD backplane lights a lamp corresponding to an error lamp number based on the status information.

In some embodiments of the disclosure, the operation that the CPU transmits packets in groups to the NVME hard disk management system to acquire status information of the NVME hard disk includes: the CPU transmits a first group of commands to the NVME hard disk management system, and judges whether status information returning an NVME error is received within preset period. In response to receiving the status information returning the NVME error within the preset period, a next group of commands is transmitted to the NVME hard disk management system. In response to not receiving the status information returning the NVME error within the preset period, a next group of commands is transmitted to the NVME hard disk management system after the preset period.

In some embodiments of the disclosure, the method further includes: in response to receiving the status information returning the NVME error within the preset period, the CPU transmits the status information to the CPLD backplane through the BMC.

In some embodiments of the disclosure, the operation that the CPU transmits packets in groups to the NVME hard disk management system to acquire status information of the NVME hard disk includes: the CPU transmits MCTP packets in groups to the NVME hard disk management system to acquire the status information of the NVME hard disk.

In some embodiments of the disclosure, the operation that the CPU transmits packets in groups to the NVME hard disk management system to acquire status information of the NVME hard disk includes: the CPU transmits MCTP packets in groups to the NVME hard disk management system through a PCIE interface to acquire the status information of the NVME hard disk.

In some embodiments of the disclosure, the operation that the CPU transmits the acquired status information to the CPLD backplane through the BMC includes: the CPU transmits the acquired status information to the BMC through a SMBUS; and the BMC receives the status information transmitted by the CPU, and transmits the status information to the CPLD backplane through the SMBUS.

In some embodiments of the disclosure, the operation that in response to receiving the status information, the CPLD backplane lights a corresponding error lamp number based on the status information includes: in response to receiving the status information, the CPLD backplane finds the error lamp number corresponding to an error hard disk based on the status information; and the CPLD backplane lights the lamp corresponding to the error lamp number.

Figure 7:
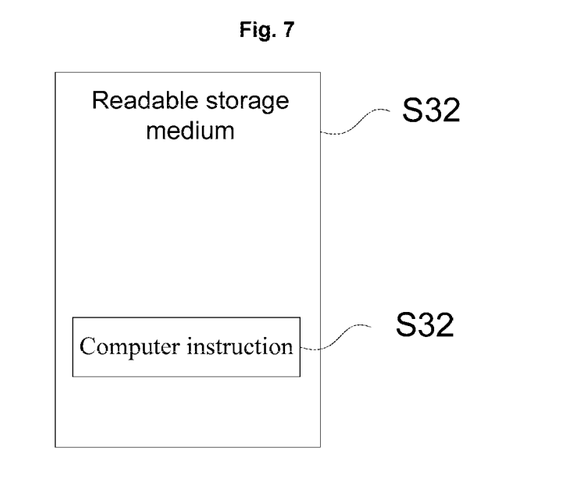
FIG. 7 is a schematic diagram of an embodiment of a computer-readable storage medium according to an embodiment.

In an embodiment of the present disclosure further provides at least one non-volatile computer-readable storage media that store a computer-readable instruction. FIG. 7 is a schematic diagram of a non-volatile computer-readable storage medium provided by the embodiments of the disclosure. As shown in FIG. 7, the non-volatile computer-readable storage medium S31 is configured to store a computer-readable instruction S32 capable of running on a processor. When the computer-readable instruction S32 is executed by at least one processor, the at least one processor performs steps of the lighting method based on an AMD platform in any of the above embodiments.

Finally, it is to be noted that those of ordinary skill in the art may understand that all or part processes in above method embodiments may be implemented by a computer-readable instruction to instruct related hardware. The computer-readable instruction of the lighting method based on the AMD platform may be stored in a computer-readable storage medium. The computer-readable instruction may include the processes of the embodiments of the above method when executed. The storage medium of the computer-readable instruction may be a magnetic disk, an optical disk, a Read Only Storage Memory (ROM), a Random Access Memory (RAM), or the like. The above embodiments of the computer-readable instruction may achieve the same or similar effects as any foregoing method embodiment corresponding thereto.

In addition, the steps and system units of the lighting method based on the AMD platform may also be implemented through using a controller and a computer-readable storage medium for storing a computer-readable instruction that enables the controller to implement the above steps or unit functions.

Those skilled in the art will also appreciate that multiple exemplary logical blocks, modules, circuits, and algorithm steps described in combination with the disclosure herein may be implemented as electronic hardware, computer software, or a combination of the electronic hardware and the computer software. To clearly describe such interchangeability of hardware and software, various illustrative components, blocks, modules, circuits, and steps have been described generally in terms of their functionality. Whether such functionality is implemented as software or hardware depends on the application and design constraints imposed on the entire system. Those skilled in the art may implement the functions in various ways for each application, but such implementation decisions are not to be interpreted as causing a departure from the scope of the disclosed embodiments of the disclosure.

In at least one exemplary design, functions may be implemented in hardware, software, firmware, or any combination thereof. When the functions are implemented in the software, the functions may be stored on the computer-readable medium as at least one instruction or code or be transferred by means of the computer-readable medium. The computer-readable medium includes a computer storage medium and a communication medium. The communication medium includes any medium transmitting a computer-readable instruction from one position to another position. The storage medium may be any available medium that can be accessed by a general or special computer. As an example but not a limitation, the computer-readable medium may include a RAM, a ROM, an EEPROM, a CD-ROM or other optical disk storage devices, magnetic disk storage devices or other magnetic storage devices, or may be used for carrying or storing the required program code in the form of instructions or data structures, and any other media that can be accessed by a general or special computer or a general or special processor. In addition, any connection may properly be called a computer-readable medium. For example, when a coaxial cable, a fiber optic cable, a twisted pair, a Digital Subscriber Line (DSL), or wireless technologies such as infrared, radio, and microwave are used to transmit software from a website, a server, or other remote sources, then the above coaxial cable, the fiber optic cable, the twisted pair, the DSL, or the wireless technologies such as the infrared, the radio, and the microwave are all included in the definition of the medium. As used herein, the magnetic disk and the optical disk include Compact Disks (CDs), laser disks, optical disks, Digital Versatile Disks (DVDs), floppy disks, Blu-ray Discs, and the disks usually reproduce data magnetically, while the optical disks reproduce data optically with lasers. Combinations of the above should also be included within the scope of the computer-readable medium. Combinations of the above content are also to be included within the scope of the computer-readable medium.

The above are exemplary embodiments of the present application, but it is to be noted that, multiple changes and modifications may be made without departing from the scope disclosed in the embodiments of the present application as defined in the claims. The functions, steps and/or actions of the method claims in accordance with the disclosed embodiments described herein need not be performed in any particular order. In addition, although elements disclosed in the embodiments of the present application may be described or claimed in the singular, unless explicitly limited to the singular, the plural may also be construed.

It is to be understood that, as used herein, the singular form "a" is intended to include the plural form as well, unless the context clearly supports an exception. It is also be understood that, "and/or" as used herein is meant to include any and all possible combinations of one or more of the associated listed items.

The serial numbers of the foregoing embodiments of the present disclosure are merely for description, and do not represent the superiority or inferiority of the embodiments.

Those of ordinary skill in the art may understand that, all or part of the steps in the above embodiments may be completed by means of hardware, or may be completed by instructing the related hardware through a program. The program may be stored in a computer-readable storage medium, and the foregoing storage medium may be the ROM, the magnetic disk, or the optical disk.

Those of ordinary skill in the art should understand that the discussion of any of the embodiments above is merely exemplary, and is not intended to imply that the scope (including the claims) disclosed in the embodiments of the disclosure is limited to these examples. Under the idea of the embodiments of the disclosure, the technical features in the embodiments above or different embodiments can also be combined. In addition, there are many other changes in different aspects of the embodiments above of the disclosure, which are not provided in detail for the sake of brevity. Therefore, any omissions, modifications, equivalent replacements, improvements and the like made within the spirit and principle of the embodiments of the present application shall all fall within the protection scope of the embodiments of the present application.

What is claimed is:

1. A lighting method based on an Advanced Micro Device (AMD) platform, comprising: performing following steps in an enterprise mode of the AMD platform:
    transmitting, by a Central Processing Unit (CPU), a first group of commands to a Non-Volatile Memory Express (NVMe) hard disk management system, and judging whether status information of NVMe error is received within preset period;
    in response to receiving the status information of NVMe error within the preset period, transmitting a next group of commands to the NVMe hard disk management system to obtain status information of NVMe hard disk;
    in response to not receiving the status information of NVMe error within the preset period, transmitting a next group of commands to the NVMe hard disk management system after the preset period to obtain the status information of NVMe hard disk;
    transmitting, by the CPU, the status information of NVMe hard disk acquired to a Complex Programmable Logic Device (CPLD) backplane through a Baseboard Management Controller (BMC);
    in response to receiving the status information of NVMe hard disk, lighting, by the CPLD backplane, a lamp corresponding to an error lamp number based on the status information of NVMe hard disk.

2. The lighting method based on the AMD platform as claimed in claim 1, wherein further comprising:
    in response to receiving the status information of NVMe error within the preset period, transmitting, by the CPU, the status information of NVMe hard disk to the CPLD backplane through the BMC.

3. The lighting method based on the AMD platform as claimed in claim 2, wherein the first group of commands and the next group of commands are management component transport protocol packets.

4. The lighting method based on the AMD platform as claimed in claim 1, wherein transmitting, by the CPU, the first group of commands to the NVMe hard disk management system comprises:
transmitting, by the CPU, the first group of commands to the NVMe hard disk management system through a Peripheral Component Interconnect Express (PCIE) interface.

5. The lighting method based on the AMD platform as claimed in claim 1, wherein transmitting, by the CPU, the status information of NVMe hard disk acquired to the CPLD backplane through the BMC comprises:
transmitting, by the CPU, the status information of NVMe hard disk acquired to the BMC through a system management bus; and
receiving, by the BMC, the status information of NVMe hard disk transmitted by the CPU, and transmitting the status information of NVMe hard disk to the CPLD backplane through the system management bus.

6. The lighting method based on the AMD platform as claimed in claim 1, wherein in response to receiving the status information of NVMe hard disk, lighting, by the CPLD backplane, the lamp corresponding to the error lamp number based on the status information of NVMe hard disk comprises:
in response to receiving the status information of NVMe hard disk, finding, by the CPLD backplane, the error lamp number corresponding to the error hard disk based on the status information of NVMe hard disk;
lighting, by the CPLD backplane, the lamp corresponding to the error lamp number.

7. The lighting method based on the AMD platform as claimed in claim 1, wherein the CPU is connected to the CPLD backplane through a Virtual Pin Port (VPP), and the CPU is connected to an NVMe hard disk through the PCIE.

8. The lighting method based on the AMD platform as claimed in claim 1, wherein further comprising:
transmitting, by the NVMe hard disk management system, interface detection signal information, present signal, and activity signal information to the CPLD backplane;
in response to receiving the interface detection signal information, the present signal, and the activity signal information, transmitting, by the CPLD backplane, Hard-Disk Drive Power Enable (HDD Power EN) to the NVMe hard disk management system.

9. The lighting method based on the AMD platform as claimed in claim 8, wherein after transmitting, by the NVMe hard disk management system, the interface detection signal information, the present signal, and the activity signal information to the CPLD backplane, further comprising:
transmitting, by the CPU, ACTLED information to the CPLD backplane;
in response to receiving the ACTLED information, lighting, by the CPLD backplane, a lamp corresponding to an active lamp number.

10. The lighting method based on the AMD platform as claimed in claim 9, wherein transmitting, by the CPU, information to the CPLD backplane comprises:
transmitting, by the CPU, the ACTLED information in the VPP format to the CPLD backplane through the VPP.

11. The lighting method based on the AMD platform as claimed in claim 1, wherein the NVMe hard disk management system comprises an NVMe Programmable Interrupt Controller (PIC) functional controller, a management endpoint, and a management interface controller.

12. A computer device, comprising: at least one processor; and
a memory, the memory is configured to store a computer-readable instruction capable of running on the processor, wherein when the computer-readable instruction is executed by the at least one processor, cause the processor to:
transmit, by a Central Processing Unit (CPU), a first group of commands to a Non-Volatile Memory Express (NVMe) hard disk management system, and judging whether status information of NVMe error is received within preset period;
in response to receiving the status information of NVMe error within the preset period, transmit a next group of commands to the NVMe hard disk management system to obtain status information of NVMe hard disk;
in response to not receiving the status information of NVMe error within the preset period, transmit a next group of commands to the NVMe hard disk management system after the preset period to obtain the status information of NVMe hard disk;
transmit, by the CPU, the status information of NVMe hard disk acquired to a Complex Programmable Logic Device (CPLD) backplane through a Baseboard Management Controller (BMC);
in response to receiving the status information of NVMe hard disk, light, by the CPLD backplane, a lamp corresponding to an error lamp number based on the status information of NVMe hard disk.

13. The computer device as claimed in claim 12, wherein when the computer-readable instruction is executed by the at least one processor, cause the processor to:
in response to receiving the status information of NVMe error within the preset period, transmit, by the CPU, the status information of NVMe hard disk to the CPLD backplane through the BMC.

14. The computer device as claimed in claim 13, wherein when the computer-readable instruction is executed by the at least one processor, cause the processor to:
transmit, by the CPU, the first group of commands to the NVMe hard disk management system through a Peripheral Component Interconnect Express (PCIE) interface.

15. The computer device as claimed in claim 12, wherein when the computer-readable instruction is executed by the at least one processor, cause the processor to:
transmit, by the CPU, the status information of NVMe hard disk acquired to the BMC through a system management bus; and
receive, by the BMC, the status information of NVMe hard disk transmitted by the CPU, and transmitting the status information of NVMe hard disk to the CPLD backplane through the system management bus.

16. The computer device as claimed in claim 12, wherein when the computer-readable instruction is executed by the at least one processor, cause the processor to:
in response to receiving the status information of NVMe hard disk, find, by the CPLD backplane, the error lamp number corresponding to the error hard disk based on the status information of NVMe hard disk;
light, by the CPLD backplane, the lamp corresponding to the error lamp number.

17. The computer device as claimed in claim 12, wherein when the computer-readable instruction is executed by the at least one processor, cause the processor to:
  transmit, by the NVMe hard disk management system, interface detection signal information, present signal, and activity signal information to the CPLD backplane;
  in response to receiving the interface detection signal information, the present signal, and the activity signal information, transmit, by the CPLD backplane, Hard-Disk Drive Power Enable (HDD Power EN) to the NVMe hard disk management system.

18. The computer device as claimed in claim 17, wherein when the computer-readable instruction is executed by the at least one processor, cause the processor to:
  transmit, by the CPU, ACTLED information to the CPLD backplane;
  in response to receiving the ACTLED information, light, by the CPLD backplane, a lamp corresponding to an active lamp number.

19. The computer device as claimed in claim 18, wherein when the computer-readable instruction is executed by the at least one processor, cause the processor to:
  transmit, by the CPU, the ACTLED information in the VPP format to the CPLD backplane through the VPP.

20. A non-transitory computer-readable storage medium, the non-transitory computer-readable storage medium is configured to store a computer-readable instruction, wherein when the computer-readable instruction is executed by at least one processor, cause the processor to:
  transmit, by a Central Processing Unit (CPU), a first group of commands to a Non-Volatile Memory Express (NVMe) hard disk management system, and judging whether status information of NVMe error is received within preset period;
  in response to receiving the status information of NVMe error within the preset period, transmit a next group of commands to the NVMe hard disk management system to obtain status information of NVMe hard disk;
  in response to not receiving the status information of NVMe error within the preset period, transmit a next group of commands to the NVMe hard disk management system after the preset period to obtain the status information of NVMe hard disk;
  transmit, by the CPU, the status information of NVMe hard disk acquired to a Complex Programmable Logic Device (CPLD) backplane through a Baseboard Management Controller (BMC);
  in response to receiving the status information of NVMe hard disk, light, by the CPLD backplane, a lamp corresponding to an error lamp number based on the status information of NVMe hard disk.

\* \* \* \* \*